(12) United States Patent
Williams et al.

(10) Patent No.: US 11,708,899 B2
(45) Date of Patent: Jul. 25, 2023

(54) PARK LOCK ROD ASSEMBLY

(71) Applicant: LINAMAR CORPORATION, Guelph (CA)

(72) Inventors: Cameron P Williams, Dexter, MI (US); Jefferey Ziemba, Novi, MI (US)

(73) Assignee: Linamar Corporation, Guelph (CA)

( * ) Notice: Subject to any disclaimer, the term of this patent is extended or adjusted under 35 U.S.C. 154(b) by 368 days.

(21) Appl. No.: 17/046,813

(22) PCT Filed: Apr. 11, 2019

(86) PCT No.: PCT/US2019/026991
§ 371 (c)(1),
(2) Date: Oct. 12, 2020

(87) PCT Pub. No.: WO2019/200099
PCT Pub. Date: Oct. 17, 2019

(65) Prior Publication Data
US 2021/0156470 A1 May 27, 2021

Related U.S. Application Data

(60) Provisional application No. 62/656,319, filed on Apr. 11, 2018.

(51) Int. Cl.
*F16H 63/34* (2006.01)
*F16H 57/00* (2012.01)

(52) U.S. Cl.
CPC . *F16H 63/3425* (2013.01); *F16H 2057/0056* (2013.01)

(58) Field of Classification Search
CPC .................... F16H 2057/0056; F16H 63/3425
See application file for complete search history.

(56) References Cited

U.S. PATENT DOCUMENTS

| | | | | |
|---|---|---|---|---|
| 4,223,768 A | * | 9/1980 | Iwanaga | F16H 63/3416 192/219.5 |
| 4,610,336 A | * | 9/1986 | Kuwayama | B60T 1/06 192/219.5 |

(Continued)

FOREIGN PATENT DOCUMENTS

| | | |
|---|---|---|
| FR | 2998238 | 5/2014 |
| JP | H09175349 | 7/1997 |
| KR | 20140111470 | 9/2014 |

*Primary Examiner* — Lori Wu
(74) *Attorney, Agent, or Firm* — Miller Canfield

(57) ABSTRACT

An improved park lock rod assembly is provided for a park lock mechanism of a vehicle transmission wherein the park lock rod assembly includes a spring-loaded lock rod captured by a guide member. The guide member includes a first bulbous open slot that is generally L-shaped and receives one end of the lock rod, and another open slot spaced axially from the first open slot that receives another end of the lock rod. This slot configuration allows the rod to pivot relative to the guide member and seat within the second open slot, which permits ready assembly of the lock rod to the guide member. The park lock rod assembly may be manually assembled without the need for crimping or other fasteners. Further, the rod is grooved to cooperate with keyhole shapes provided in the open slots wherein the groove and slot configurations permit the rod to be assembled into the guide member while preventing separation during reciprocating movement of the lock rod.

20 Claims, 3 Drawing Sheets

(56) References Cited

U.S. PATENT DOCUMENTS

2012/0018259 A1* 1/2012 Prix .................. F16H 63/3416
                                                188/69
2012/0103752 A1* 5/2012 Kim .................. F16H 63/3416
                                                192/219.5
2017/0030465 A1   2/2017 Dearden et al.

* cited by examiner

PARK LOCK ROD ASSEMBLY

CROSS REFERENCE TO RELATED APPLICATIONS

This application claims priority of U.S. Provisional Patent Application No. 62/656,319, filed Apr. 11, 2018, the disclosure of which is incorporated herein by reference in its entirety

BACKGROUND OF THE INVENTION

1. Field of the Invention

The present invention relates to a park lock rod assembly for a park lock mechanism of a vehicle transmission.

2. Description of Related Art

It is commonly known for vehicle transmissions to include a park lock mechanism for electronically or manually shifting the vehicle into a parked position by locking a gear in the transmission. The park lock mechanism typically includes a shift lever and rod actuated by the vehicle operator for actuating a park lock rod assembly between an unlocked position and a locked position camming a pawl member into engagement with a parking lock gear to prevent rotation thereof and lock the transmission in a parked position. An example of a park lock mechanism is disclosed in U.S. Pat. No. 5,295,412, the disclosure of which is incorporated herein by reference in its entirety.

The park lock rod assembly includes a rod and a spring loaded and captured in a guide member between the shift lever and the pawl member. Currently, capturing the rod and spring requires a fixture to compress the spring and then crimping or stacking the rod to the guide member to complete the assembly of the park lock rod. The fixture and crimping process increases the cost and complexity of the assembly and requires tightly controlled operation to maintain required tolerances.

Therefore, it is desirable to provide a manually assembled park lock rod assembly wherein the rod and spring may be loaded and captured in the guide member manually without the assistance of a fixture and without additional crimping processes.

SUMMARY OF THE INVENTION

The invention relates to a park lock rod assembly connectable between a shift rod and lever for actuating a pawl member into locking engagement with a park lock gear to lock a vehicle transmission in a parked position. The park lock rod assembly is spring loaded and includes a lock rod captured by a guide member so as to drive a roller cage mechanism and in turn drive the pawl member into locking engagement with the park lock gear. The guide member includes a first bulbous open slot that is generally L-shaped and receives one end of the lock rod, and another open slot spaced axially from the first open slot that receives another end of the lock rod. This slot configuration allows the rod to slide along the length of the first open slot so that the rod can swing or pivot relative to the guide member and seat within the second open slot, which permits ready assembly of the lock rod to the guide member. As such, the park lock rod assembly may be assembled manually by hand without the need of a fixture wherein a spring seats within the guide member and maintains the rod in slidable engagement with the guide member without the need for crimping or other fasteners.

Preferably to facilitate joining of the rod to the guide member, the rod is grooved to cooperate with keyhole shapes provided in the open slots wherein the groove and slot configurations permit the rod to be assembled into the guide member without tools or fixtures while preventing separation of these components during reciprocating movement of the lock rod.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
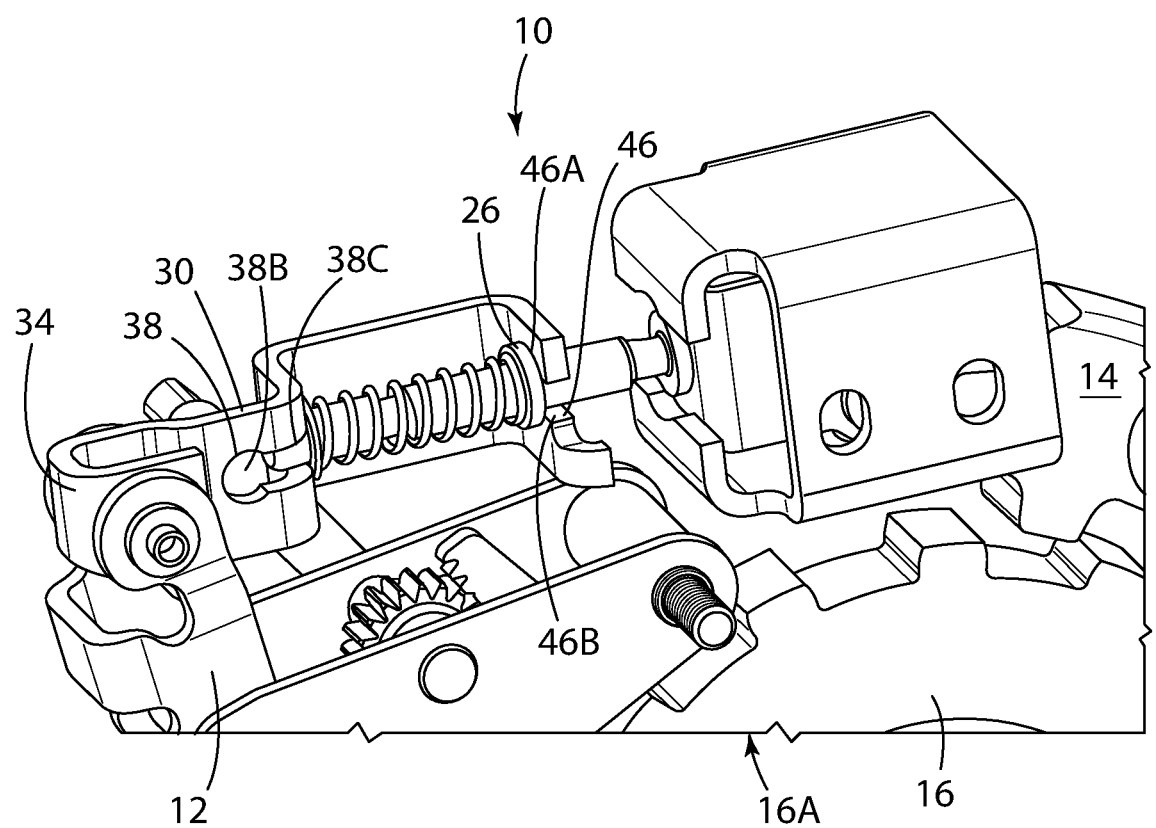
FIG. 1 is a perspective view of a park lock rod assembly according to a preferred embodiment of the invention.

Referring to the Figures, wherein like numerals indicate like or corresponding parts throughout the several views, a park lock rod assembly according to a preferred embodiment of the invention is shown at 10 in FIG. 1. The park lock rod assembly 10 is assembled in a park lock mechanism between a shift rod and lever generally shown at 12 and a pawl member generally shown at 14 for actuating the pawl member 14 into locking engagement with a park lock gear 16 to prevent rotation of the gear 16 and there by lock the transmission 16A in a parked position as is commonly known. The park lock rod assembly 10 is spring loaded and captured by a guide member 30 for operable connection between the shift lever 12 and the pawl member 14.

Referring to FIGS. 2A-2D, the park lock rod assembly 10 includes an elongated rod 20 extending between axially opposite first and second ends 20A and 20B and a coil spring 22 seated around the rod 20 between the ends. The coil spring 22 is seated between spaced apart first and second washers 24, 26 to retain the coil spring 22 axially along the rod 20 and define shoulders configured to abut against the guide member 30 during spring compression. A roller cage mechanism 28 is fixedly secured to the second end 20B of the rod 20 for engagement with the pawl member 14 for actuation of pawl member 14 into locking engagement with the park lock gear 16.

The rod 20 and spring 22 are operatively coupled to and supported by the guide member 30 for actuation between the unlocked and parked positions. The guide member 30 is a stamped plate member forming a first U-shaped portion 32 connected to the shift lever 12 and a second U-shaped portion 34 for capturing the rod 20 and spring 22. A flat neck portion 36 interconnects the first and second U-shaped portions 32, 34 and includes a bulbous open slot 38 therein. The second U-shaped portion includes a first leg 40 extending perpendicularly from the neck portion 36 and a spaced apart second leg 42 parallel to the first leg 40. The first and second legs 40, 42 are interconnected by a bridge portion 44. The first leg 40 includes a second slot portion 38A of the bulbous open slot 38 extending therethrough and the second leg 42 includes an open slot 46 coaxially aligned with the open slot 38 for receiving the first end 20A of the rod 20 through the open slot 38 and the second end 20B through the open slot 46.

Figure 2A:
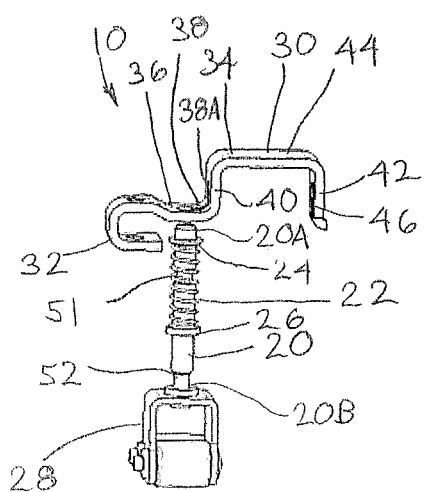
FIGS. 2A-2D are front plan views of the assembly steps of the park lock rod assembly.
Figure 2B:
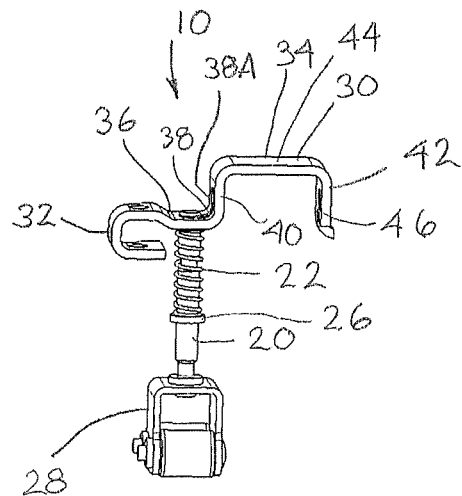
Figure 2C:
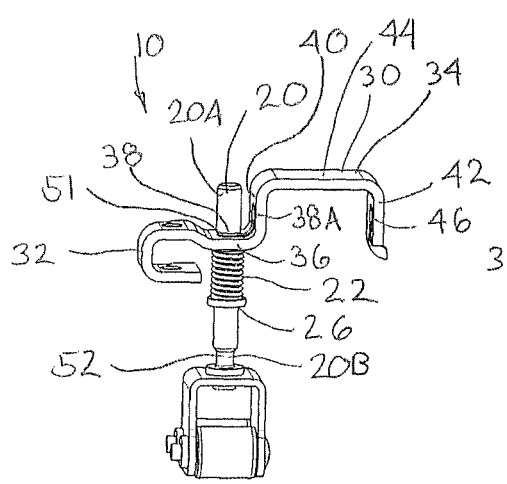
Figure 2D:
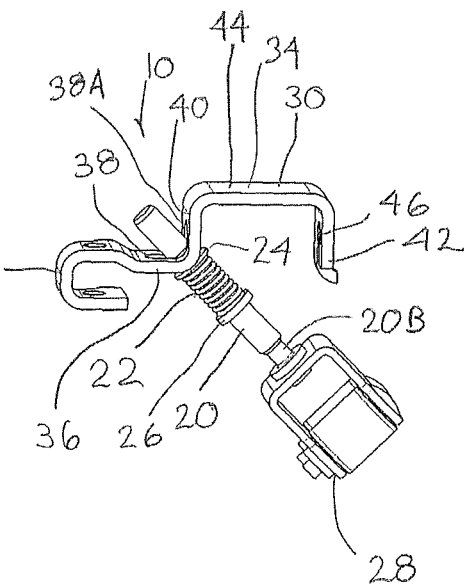

The open slot 38 has the second slot portion 38A oriented generally perpendicular to a first slot portion 38B formed in the flat neck portion 36 so that the open slot 38 is generally L-shaped when viewed from the side. The first slot portion 38B allows the rod 20 to be positioned below the guide member 30 and aligned with the first slot portion 38B as seen in FIG. 2A. The rod 20 is then inserted upwardly into the first slot portion 38B as generally indicated by FIGS. 2B-2C. Further, the elongate open slot 38 has the L-shape wherein the first and second slot portions 38B and 38A are joined by an intermediate slot portion 38C. This slot configuration allows the rod 20 to slide along the length of the open slot 38 from the first slot portion 38B to the perpendicular second slot portion 38A so that the rod 20 can swing or pivot relative to the guide member 30 as generally seen in FIG. 2D. This swinging action permits ready assembly of the lock rod 20 to the guide member 30 as described further below.

Figure 3A:
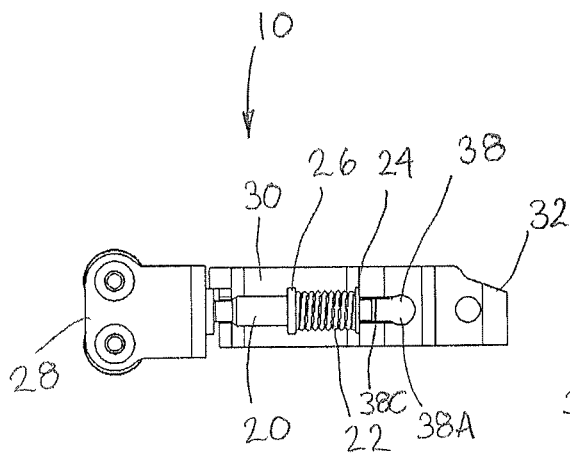
FIG. 3A is a top view of the park lock rod assembly in a compressed and installed position.
Figure 3B:
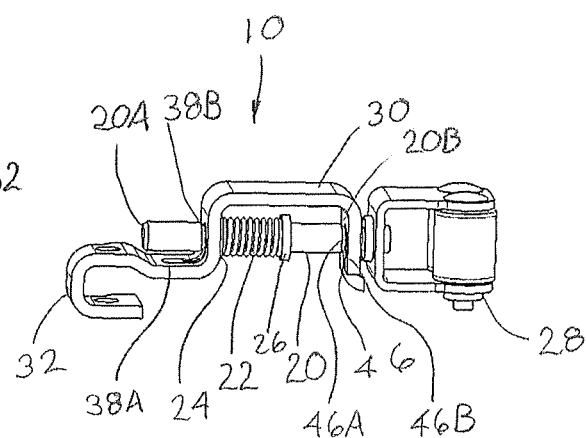
FIG. 3B is a side view of the park lock rod assembly in the compressed and installed position.

In assembly, referring to FIGS. 2A-2D, the coil spring 22 is seated around the rod 20 and positioned axially between the spaced first and second washers 24, 26. The rod 20 is positioned generally perpendicular to the guide member 30 in FIG. 2A and the second end of the rod 20 is then inserted through the bulbous open slot 38 until the coil spring 22 is fully compressed as shown in FIGS. 2B and 2C. The rod 20 is then pivoted towards the second U-shaped portion 34, as shown in FIG. 2D, until the rod 20 is received in the open slot 46 in the second leg 42 as shown in FIGS. 3A and 3B.

Figure 4A:
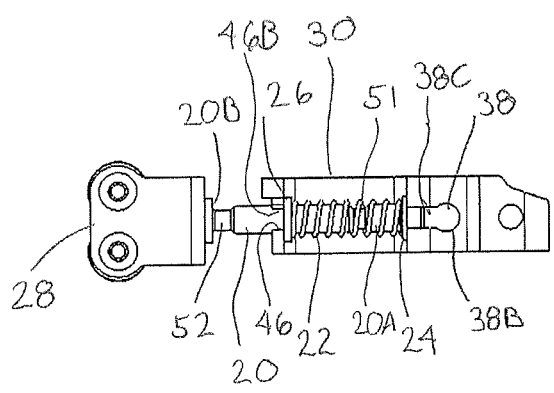
FIG. 4A is a top view of the park lock rod assembly in a fully expanded and installed position.
Figure 4B:
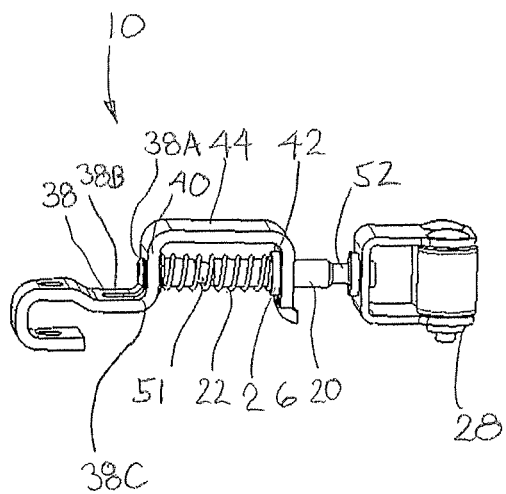
FIG. 4B is a side view of the park lock rod assembly in the fully expanded and installed position.

Referring now to FIGS. 4A and 4B, as the rod 20 is released in the open slot 46 the spring 22 expands and is biased and compressed between the first and second washers 24, 26 capturing the rod 20 between the first and second legs 40, 42 of the guide member 30. The park lock rod assembly 10 may be assembled manually by hand without the need of a fixture and the spring 22 seated between the first and second washers 24, 26 maintains the rod 20 captured between the legs 40, 42 of the guide member 30 without the need for crimping or other fasteners.

To further facilitate joining of the rod 20 to the guide member 30, the rod 20 is grooved to cooperate with keyhole shapes provided in the open slots 38 and 46 to permit the above-described assembly of the rod 20 and guide member 30. The groove and slot configurations permit the rod 20 to be fully inserted into the guide member 30 as seen in FIGS. 3A and 3B while preventing separation of these components when the spring 22 displaces the rod 20 to the extended position of FIGS. 4A and 4B. In more detail, the rod 20 includes narrowed sections or grooves 51 and 52 near the opposite rod ends 20A and 20B as seen in FIGS. 2A, 2C to align with the open slots 38 and 46 during assembly while preventing separation of the rod 20 from the guide member 30 when the grooves 51 and 52 displace axially with the rod 20 out of alignment with the open slots 38 and 46.

In more detail, the bulbous open slot 38 is keyhole-shaped at the first and second slot portions 38B and 38A which are joined by the intermediate slot portion 38C. The intermediate slot portion 38C has a narrowed width proximate the groove 51, and the open slot 38 has a wider width at the slot portions 38A and 38B so as to permit sliding therethrough of the widest portions of the rod 20 located axially adjacent to the groove 51. Since the intermediate slot portion 38C has a width proximate the diametric width of the groove 51, the rod 20 can slide along the intermediate slot portion 38C and pivot between the first and second slot portions 38B and 38A only when the groove 51 is axially aligned with the narrow slot portion 38C. Once the rod 20 is seated in the second slot portion 38A at the one slot end, the rod 20 can slide axially therethrough for reciprocating movement of the lock rod 20 as described above. During operation, the rod 20 shifts axially, and the rod 20 cannot slide back through the narrower slot portion 38C unless the groove 51 aligns therewith. This serves to lock the rod 20 within the guide portion 30 after assembly and during operation.

Similarly, the open slot 46 has a keyhole shape defined by a wider end portion 46A and a narrower slot mouth 46B. The geometry and dimensions of the end portion 46A and slot mouth 46B define a keyhole shape that corresponds to the keyhole shape of the groove portion 38B shown in FIG. 3A. During assembly, the groove 52 on the rod 20 is able to enter the slot mouth 38B and slide upwardly and seat within the end portion 46A during the above-described pivoting of the rod 20 to the position of FIGS. 3A and 3B. During pivoting to this assembled position, the groove 52 axially aligns with the slot mouth 46B and pivots to the end portion 46A. Once assembled, the rod 20 can then slide axially through the end portion 46A during reciprocating movement of the rod 20 but cannot slide back through the narrower slot mouth 38B unless the groove 52 axially aligns therewith. This groove and slot configuration defined by the open slots 38 and 46 thereby retains the rod 20 within the guide member 30 during normal operation thereof, while permitting ready assembly of these components without the necessity of specific tooling or fixtures.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

We claim:

1. A park lock rod assembly mountable in a park lock mechanism for actuating a pawl member into locking engagement with a park lock gear to releasably lock a vehicle transmission when parked, said park lock rod assembly comprising:
   a lock rod extending between axially opposite first and second rod ends;
   a coil spring seated around said lock rod between said first and second rod ends;
   a roller cage mechanism fixedly secured to said second rod end for engagement with said pawl member;
   a guide member slidably supporting said lock rod and said spring for actuation between unlocked and parked positions, said guide member including first and second mounting legs, which are axially spaced apart, and a neck portion, which extends axially from said first mounting leg, said guide member including a first open slot extending in an L-shape defined by a first slot portion, which extends axially in said neck portion, and a second slot portion, which extends transverse to said neck portion in said first mounting leg, and further including a second open slot in said second mounting leg, which extends transverse to said neck portion and opens from a slot mouth to transversely receive said lock rod and permit axial sliding of said lock rod through said second open slot, said lock rod being insertable transversely into said first slot portion when oriented transverse to said guide member during assembly and pivotable along said first open slot to seat transversely in said second slot portion and in said second open slot, wherein said lock rod is positioned axially relative to said guide member after assembly and is axially slidable through said second open slot and said second slot portion of said first open slot.

2. The park lock rod assembly according to claim 1, wherein said first and second open slots permit axial reciprocating movement of said lock rod between said unlocked and parked positions by which said roller cage mechanism is actuated axially to lock and unlock said park gear.

3. The park lock rod assembly according to claim 2, wherein said guide member is a stamped plate member forming a first U-shaped portion connectable to a shift lever of a transmission and a second U-shaped portion which comprises said first and second mounting legs oriented transverse to said lock rod for capturing said lock rod and said spring.

4. The park lock rod assembly according to claim 3, wherein said neck portion interconnects said first and second U-shaped portions.

5. The park lock rod assembly according to claim 1, wherein said second slot portion of said first open slot and said second open slot are coaxially aligned to permit said axial sliding of said lock rod therethrough.

6. The park lock rod assembly according to claim 5, wherein said coil spring is seated between spaced apart first and second washers to retain said coil spring axially along said lock rod and abut against said coil spring during spring compression from axial displacement of said lock rod.

7. The park lock rod assembly according to claim 1, wherein said first slot portion and said second slot portion are joined together by an intermediate slot portion and each have a wide slot width corresponding to a rod width of said lock rod to permit sliding of said lock rod therethrough, said intermediate slot portion defining a narrow slot width narrower than said wide slot widths, and said lock rod including a first rod groove proximate said first rod end having a groove width narrower than said rod width such that said lock rod is pivotable between said first and second slot portions through said intermediate slot portion only when said first rod groove is aligned with said intermediate slot portion.

8. The park lock rod assembly according to claim 7, wherein said lock rod is retained in said second slot portion during axial rod movement when said first rod groove is displaced axially out of alignment with said intermediate slot portion.

9. The park lock rod assembly according to claim 1, wherein said second open slot comprises an end portion and said slot mouth, wherein said slot mouth opens transversely into said end portion, said end portion having a wide slot width corresponding to a rod width of said lock rod to permit sliding of said lock rod therethrough, said slot mouth defining a narrow slot width narrower than said wide slot width, and said lock rod including a rod groove proximate said second rod end, which has a groove width narrower than said rod width such that said lock rod seats transversely in said end portion during assembly only when said rod groove is aligned with said slot mouth.

10. The park lock rod assembly according to claim 9, wherein said lock rod is retained in said end portion of said second open slot during axial rod movement when said rod groove is displaced axially out of alignment with said slot mouth.

11. A park lock rod assembly mountable in a park lock mechanism for actuating a pawl member into locking engagement with a park lock gear to releasably lock a vehicle transmission when parked, said park lock rod assembly comprising:

a lock rod extending between axially opposite first and second rod ends;

a coil spring seated around said lock rod between said first and second rod ends;

a roller cage mechanism fixedly secured to said second rod end for engagement with said pawl member;

a guide member slidably supporting said lock rod and said spring for actuation between unlocked and parked positions, said guide member including first and second mounting legs, which are axially spaced apart, and a neck portion, which extends axially from said first mounting leg, said guide member including a first open slot extending in an L-shape defined by a first slot portion, which extends axially in said neck portion, and a second slot portion, which extends transverse to said neck portion in said first mounting leg, and further including a second open slot in said second mounting leg, which has an end portion which extends transverse to said neck portion and opens from a slot mouth to transversely receive said lock rod and permit axial sliding of said lock rod through said second open slot, said first rod end of said lock rod being insertable transversely into said first slot portion when oriented transverse to said guide member during assembly and pivotable so as to slide along said first open slot to seat transversely in said second slot portion after assembly, and said second end of said lock rod being slidable into said slot mouth during assembly and seating in said end portion of said second open slot after assembly, wherein said second slot portion of said first open slot and said second open slot are coaxially aligned to permit said axial sliding of said lock rod therethrough after assembly.

12. The park lock rod assembly according to claim 11, wherein said first and second open slots permit axial reciprocating movement of said lock rod between said unlocked and parked positions by which said roller cage mechanism is actuated axially to lock and unlock said park gear.

13. The park lock rod assembly according to claim 12, wherein said guide member is a stamped plate member forming a first U-shaped portion connectable to a shift lever of a transmission and a second U-shaped portion which comprises said first and second mounting legs oriented transverse to said lock rod for capturing said lock rod and said spring.

14. The park lock rod assembly according to claim 13, wherein said neck portion interconnects said first and second U-shaped portions.

15. The park lock rod assembly according to claim 14, wherein said coil spring is seated on said lock rod and compressible against said guide member to permit axial sliding of said lock rod to said parked position and bias said lock rod back to said unlocked position.

16. The park lock rod assembly according to claim 11, wherein said first and second open slots permit pivoting movement of said lock rod during assembly, and restrain said lock rod in said guide member during operation to prevent disassembly of said lock rod from said guide member.

17. The park lock rod assembly according to claim 11, wherein said lock rod displaces along said first open slot between said first and second slot portions during assembly.

18. The park lock rod assembly according to claim 17, wherein said first slot portion and said second slot portion are joined together by an intermediate slot portion and each have a respective slot width corresponding to a rod width of said lock rod to permit sliding of said lock rod therethrough, said intermediate slot portion defining a respective slot width narrower than said wide slot widths of said first and second slot portions, and said lock rod including a first rod groove proximate said first rod end having a respective groove width narrower than said rod width such that said lock rod is pivotable between said first and second slot portions through said intermediate slot portion only when said first rod groove is aligned with said intermediate slot portion.

19. The park lock rod assembly according to claim 18, wherein said second open slot comprises the end portion and said slot mouth, wherein said slot mouth opens transversely into said end portion, said end portion having a respective slot width corresponding to said rod width to permit sliding of said lock rod therethrough, said slot mouth defining a respective slot width narrower than said wide slot width of said end portion, and said lock rod including a second rod groove proximate said second rod end, which has a respective groove width narrower than said rod width such that said lock rod seats transversely in said end portion during assembly only when said second rod groove is aligned with said slot mouth.

20. The park lock rod assembly according to claim 19, wherein said lock rod is retained in second slot portion of said first open slot and in said end portion of said second open slot during axial rod movement thereof when said first and second rod grooves are displaced axially out of alignment with said intermediate slot portion and said slot mouth respectively.

* * * * *